US009672154B1

(12) United States Patent
Hsu et al.

(10) Patent No.: US 9,672,154 B1
(45) Date of Patent: Jun. 6, 2017

(54) METHODS AND APPARATUS FOR DETERMINING MEMORY ACCESS PATTERNS FOR CACHE PREFETCH IN AN OUT-OF-ORDER PROCESSOR

(71) Applicant: Marvell International Ltd., Hamilton (BM)

(72) Inventors: Hunglin Hsu, Cupertino, CA (US); Viney Gautam, Sunnyvale, CA (US); Yicheng Guo, Milpitis, CA (US); Warren Menezes, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 119 days.

(21) Appl. No.: 14/597,682

(22) Filed: Jan. 15, 2015

Related U.S. Application Data

(60) Provisional application No. 61/927,733, filed on Jan. 15, 2014.

(51) Int. Cl.
*G06F 12/00* (2006.01)
*G06F 12/0862* (2016.01)

(52) U.S. Cl.
CPC ................ *G06F 12/0862* (2013.01)

(58) Field of Classification Search
CPC .. G06F 9/30036; G06F 9/3004; G06F 9/3012; G06F 9/30141; G06F 9/3455; G06F 9/3824; G06F 9/3826; G06F 9/3836; G06F 9/3857; G06F 9/3859; G06F 9/3871; G06F 9/3885; G11B 2020/10916; G11B 2020/1267; G11B 21/106
USPC ......... 711/137, 207, 205, 117, 213
See application file for complete search history.

(56) References Cited

U.S. PATENT DOCUMENTS

| | | | | |
|---|---|---|---|---|
| 5,357,618 A * | 10/1994 | Mirza | G06F 9/30043 | 711/213 |
| 6,574,713 B1 * | 6/2003 | Kosche | G06F 8/4442 | 711/117 |
| 2013/0054494 A1 * | 2/2013 | Haber | G06F 11/3452 | 706/12 |
| 2014/0281351 A1 * | 9/2014 | Topp | G06F 12/1027 | 711/205 |
| 2015/0134933 A1 * | 5/2015 | Holm | G06F 12/0862 | 712/207 |

* cited by examiner

*Primary Examiner* — Mardochee Chery

(57) ABSTRACT

In aspects of determining memory access patterns for cache prefetch in an out-of-order processor, data is maintained in a cache when copied from system memory of a computing device, and load data instructions are processed to access the cache data. The load data instructions include incremental load data instructions and non-incremental load data instructions that access the data from contiguous memory addresses. The data is prefetched ahead of processing the load data instructions, where prefetch requests are initiated based on the load data instructions. A stride is calculated as the distance between the incremental load data instructions. Further, the stride can be corrected for the non-incremental load data instructions to correlate with the calculated stride. The corrected stride represents the data as a sequential data stream having a fixed stride, and prefetching the data appears sequential for both the incremental and non-incremental load data instructions.

20 Claims, 5 Drawing Sheets

METHODS AND APPARATUS FOR DETERMINING MEMORY ACCESS PATTERNS FOR CACHE PREFETCH IN AN OUT-OF-ORDER PROCESSOR

CROSS REFERENCE TO RELATED APPLICATION(S)

This application claims priority to U.S. Provisional Patent Application Ser. No. 61/927,733 filed Jan. 15, 2014, the disclosure of which is incorporated herein by reference.

BACKGROUND

Computing devices are implemented with a computer processor and memory device, and can also include hierarchical levels of cache memory (referred to herein as a "cache"). A cache is utilized by the computer processor in a computing device to reduce the average data access time from main memory, and the computing device can be implemented with multiple levels of cache that include smaller, faster caches backed-up by larger, slower caches that store copies of data for faster access. For example, a computing device may include a level one (L1) cache, a level (L2) cache (and so on), and the memory device (or main memory). Generally, the processor of the computing device processes load data instructions (LDR) to load data required for a particular operation, and operates to first check the L1 cache for the data, and for a data hit (i.e., the data is contained in the L1 cache), the processor continues operation at a higher speed. If the data is not contained in the L1 cache (referred to as a data miss), the processor checks the next level of cache—e.g., the L2 cache (and so on), before the memory device (or main memory) is checked for the data.

Generally, the load data instructions are processed to access memory (e.g., the cache levels and memory device) in a contiguous manner. If the sequence of accessing memory can be accurately predicted, then cache lines of the data can be copied to one or more levels of the cache, thus increasing the cache hit rate. This is commonly referred to as prefetch, and a cache line (e.g., a cache block of data) can be copied from the memory device into cache. The prefetch mechanism requests cache lines that are copied to the localized caches well in advance of the load data instructions being processed to access the cache data from a particular cache line.

A software program that is executed by a processor of a computing device may process the load data instructions in recursive loops that access memory in an incremental order, such as to access a memory location that is incremented every time the loop is incremented. For example, load data instructions are generated by a loop that increments a memory address, such as for an instruction (LDR) that accesses a memory address {0x0,0x4,0x8} as LDR 0x0, LDR 0x4, LDR 0x8, . . . LDR 0x120, LDR 0x124, etc. In this example, the LDR instructions are generated when a loop increments the address by four bytes (a word), and the software program accesses a contiguous word every iteration. Because the distance between each instruction is four bytes, the prefetch mechanism can generate a prefetch access to obtain the word well ahead of a load data instruction for the word being executed.

The distance between each memory address for each respective LDR instruction is commonly called the stride, and may be any value from one byte to multiples of a cache line. A computing device can implement stride detection logic that calculates the stride between an observed load address and the last accessed address for a particular stream of load data instructions, as tracked by a program counter. Once the stride is calculated, multiple predicted preload instructions for incremental values of the stride can be processed to prefetch the corresponding data. For example, the incremental memory access for a cache line can be represented as {0,1,2,3,4,5,6} and the stride [1,1,1,1,1,1] is one (1) as calculated by the stride detection logic, where future instruction transactions can be predicted as {9,10,11, 12,13,14 . . . }. As in this example, the stride detection forms the basis of the prefetch logic, and if the stride detection logic detects that the stride is no longer the same as the previous history of strides, the prefetch logic stops prefetching the predicted data.

The stride distance calculation is straight-forward when the stream of load data instructions is in order. Further, and to achieve a higher CPU performance, memory disambiguation can be implemented that allows for the load data instructions to be out of order for data access in memory. A common technique for memory disambiguation is Read-after-Read (RAR) disambiguation, which provides that earlier loads can outrun later loads, even if the memory address dependencies are not known. The address dependencies are resolved later once the physical address of the later instruction is determined.

However, since the load data instructions may be out of order, the stride that is calculated between the instructions is not accurate for every disambiguation, which interrupts the prefetch logic. For example, the memory access for a cache line can be represented as {0,3,4,1,6,2,5} and the stride is [3,1,−3,5,−4,3]. The stride detection is not uniform and in this example, memory access 1 and 2 are pushed aside for disambiguation to allow for access 3 and 4 to pass through before access 1 is loaded into the data stream. Similarly, access 5 is pushed aside for disambiguation to allow for access 6 to pass through before access 2 and 5 are loaded into the data stream. In this example, the stride detection is still one (1), however the prefetch logic cannot determine the next predicted stride and will interrupt prefetching due to the non-uniform detection of the load instructions being out of order. The non-ordered memory disambiguation interrupts prefetching the data for subsequent LDR instructions which can then increase the average data access time.

SUMMARY

This Summary introduces concepts of determining memory access patterns for cache prefetch in an out-of-order processor, and the concepts are further described below in the Detailed Description and/or shown in the Figures. Accordingly, this Summary should not be considered to describe essential features nor used to limit the scope of the claimed subject matter.

In one aspect of determining memory access patterns for cache prefetch in an out-of-order processor, a computing device includes a cache memory to maintain data that is copied from system memory, and includes a processor that processes load data instructions to access bytes of the data from the cache memory. The load data instructions include incremental load data instructions and non-incremental load data instructions that access bytes of the data from contiguous memory addresses. The processor of the computing device implements prefetch logic to prefetch the data from the system memory ahead of processing the load data instructions, where the prefetch logic initiates prefetch requests based on the load data instructions. The processor of the computing device also implements stride detection logic to calculate a stride as the distance between the incremental load data instructions. The stride detection logic also corrects the stride for the non-incremental load data instructions to correlate with the calculated stride of the incremental load data instructions. The corrected stride represents the data as a sequential data stream having a fixed stride, and prefetching the data appears sequential for both the incremental and non-incremental load data instructions.

A method is described for maintaining data in cache memory, where the data is copied from system memory of a computing device. Load data instructions are processed to access bytes of the data from the cache memory, where the load data instructions include incremental load data instructions and non-incremental load data instructions that access the bytes of data from contiguous memory addresses. The method also includes prefetching the data from the system memory ahead of processing the load data instructions, where prefetch requests are initiated based on the load data instructions. The method also includes calculating a stride as the distance between the incremental load data instructions, and correcting the stride for the non-incremental load data instructions to correlate with the calculated stride of the incremental load data instructions.

Another method is described for processing load data instructions to access data from cache memory, where the load data instructions include incremental load data instructions and non-incremental load data instructions that access the data from contiguous memory addresses. The method also includes prefetching the data from system memory ahead of processing the load data instructions, where prefetch requests are initiated based on the load data instructions. The method also includes calculating a stride as the distance between the incremental load data instructions, and accounting for the non-incremental load data instructions that access the data from the contiguous memory addresses, the accounting enabling the prefetch requests for the non-incremental load data instructions based on the calculated stride.

The details of one or more implementations are set forth in the accompanying drawings and the description below. Other features and advantages will be apparent from the description and drawings.

BRIEF DESCRIPTION OF THE DRAWINGS

Details of determining memory access patterns for cache prefetch in an out-of-order processor are described with reference to the following Figures. The same numbers may be used throughout to reference like features and components that are shown in the Figures.

DETAILED DESCRIPTION

Computing devices, such as computers, mobile phones, tablet devices, digital cameras, multimedia devices, printers, and many other types of wired and wireless devices can be implemented with hierarchy levels of cache and memory, as well as a processing system that includes prefetch logic to prefetch data from memory ahead of processing load data instructions that access cached data. The processing system of a computing device also implements stride detection logic to calculate a stride as the distance between incremental load data instructions that access the data from contiguous memory addresses. The processing system of the computing device also implements disambiguation logic to account for non-incremental load data instructions that access the data from the contiguous memory addresses. As described above, non-incremental load data instructions can interrupt the prefetch logic from prefetching the data ahead of processing the instructions, thus increasing the average data access time. The prefetching of contiguous memory is implemented for load data instructions that are incremental by a stride, and the prefetch logic monitors the loads as being incremental. However, memory disambiguation results in some of the load data instructions being out of order (e.g., an out-of-order processor), as well as non-contiguous memory reads of contiguous memory locations, which interrupts the prefetch monitoring.

Aspects of determining memory access patterns for cache prefetch in an out-of-order processor correct the stride stream so that the prefetch logic can continue to initiate the prefetch data requests. The stride detection logic is implemented to correct the stride for the non-incremental load data instructions to correlate with a calculated stride of the incremental load data instructions. The stride detection logic corrects the stride based on the disambiguation logic that accounts for the non-incremental load data instructions, and represents the data as a sequential data stream having a fixed stride. The prefetch logic can then continue the prefetch requests of the data from memory, which appears sequential for both the incremental load data instructions and the non-incremental load data instructions based on the corrected stride.

While features and concepts of determining memory access patterns for cache prefetch in an out-of-order processor can be implemented in any number of different devices, systems, environments, and/or configurations, aspects of determining memory access patterns for cache prefetch in an out-of-order processor are described in the context of the following example devices, systems, and methods.

Figure 1:
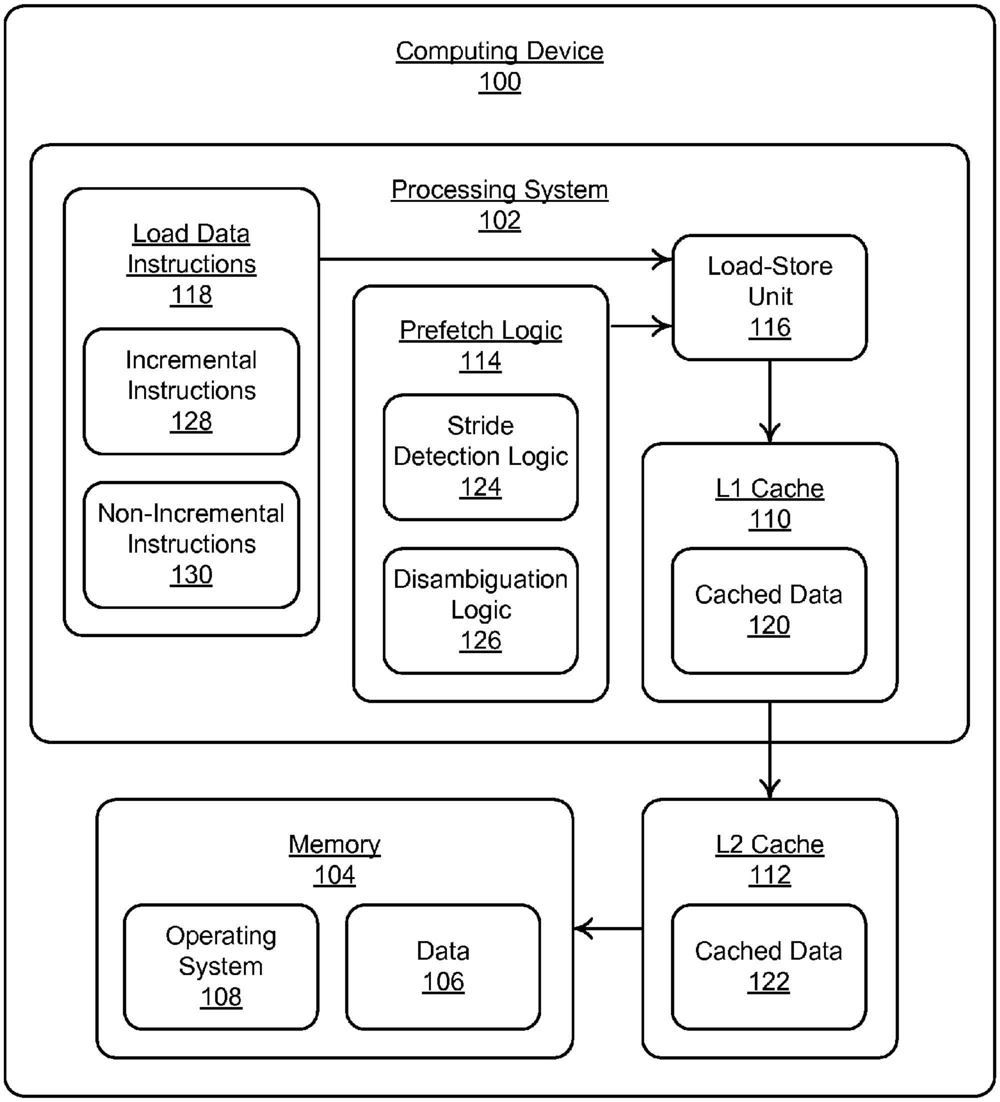
FIG. 1 illustrates an example computing device in which aspects of determining memory access patterns for cache prefetch in an out-of-order processor can be implemented.

FIG. 1 illustrates an example computing device 100 in which aspects of determining memory access patterns for cache prefetch in an out-of-order processor can be implemented. The example computing device 100 is representative of any one or combination of a mobile phone, tablet computer, digital camera, computing device, communication, entertainment, gaming, navigation, and/or other type of wired or portable electronic device. The computing device 100 can be implemented with various components, such as a processing system 102 and memory 104, a power source (e.g., a battery for mobile devices) to power device components, and with any number and combination of different components as further described with reference to the example device shown in FIG. 5.

The memory 104 can be implemented as any suitable memory device or electronic data storage in the computing device to store data 106 and device applications, such as an operating system 108 of the computing device. The computing device 100 includes hierarchy levels of memory, and in this example, is implemented with a level one (L1) cache 110, a level (L2) cache 112, and the memory 104. The processing system 102 includes prefetch logic 114 and a load-store unit 116 that is implemented as a hardware component to manage load and store operations of the cache memory.

The prefetch logic 114 is implemented to prefetch the data 106 from the memory 104 ahead of processing load data instructions 118 that access the cached data 120 in the L1 cache 110 and/or the cached data 122 in the L2 cache 112. In this example, the prefetch logic 114 includes stride detection logic 124 and disambiguation logic 126, and the prefetch logic 114 can be implemented as executable software instructions (e.g., computer-executable instructions) that are executable by the processing system 102 of the computing device to implement aspects of determining memory access patterns for cache prefetch in an out-of-order processor. Generally, the prefetch logic 114 may be implemented and/or described in the general context of software, firmware, hardware (e.g., fixed logic circuitry), applications, modules, or any combination thereof. In implementations, the processing system 102 and the prefetch logic 114 may be implemented as a system-on-chip (SoC) in the computing device 100, such as described with reference to the example SoC shown in FIG. 3.

Generally, the processing system 102 (e.g., a processor) of the computing device 100 processes the load data instructions (LDR) 118 to load data required for a particular operation, and the load-store unit 116 operates to first check the L1 cache 110 for the cached data 120, and for a data hit (i.e., the data is contained in the L1 cache), the processor continues operation at a higher speed. If the data is not contained in the L1 cache (referred to as a data miss), the processor checks the L2 cache 112 (e.g., the next level of cache) for the cached data 122, before the memory 104 is checked for the data 106. The load data instructions 118 can include incremental load data instructions 128 and non-incremental load data instructions 130 that access the data from contiguous memory addresses.

As described above, the load data instructions 118 are processed to access the memory 104 in a contiguous manner, and cache lines of the data 106 can be copied to the L1 cache 110 and/or to the L2 cache 112, which is commonly referred to as prefetch. The load data instructions 118 can be processed in recursive loops that access the memory in an incremental order, such as to access a memory location that is incremented every time the loop is incremented. The distance between the incremental load data instructions 128 is commonly called the stride, and may be any value from one byte to multiples of a cache line. The stride detection logic 124 is implemented in the computing device 100 to calculate the stride as the distance between the incremental load data instructions. However, for the non-incremental load data instructions 130 that access the data from the contiguous memory addresses, conventional prefetch logic cannot determine the next predicted stride and will interrupt prefetching due to the non-uniform detection of the load instructions being out of order. The non-ordered memory disambiguation interrupts prefetching the data for subsequent load data instructions, which can then increase the average data access time.

Aspects of determining memory access patterns for cache prefetch in an out-of-order processor correct the stride stream so that the prefetch logic 114 can take this correction into account to continue the prefetch requests. The disambiguation logic 126 is implemented to account for the non-incremental load data instructions 130 that access bytes of data from the contiguous memory addresses. In implementations, the disambiguation logic 126 provides that the first load data instruction that encounters non-incremental instructions being placed aside will carry corrective information. The disambiguation logic 126 can assert a flag for each of the non-incremental load data instructions 130 that are set aside to first process one or more of the incremental load data instructions 128, where consecutive non-incremental load data instructions can be flagged and set aside, and a flag remains asserted until the corresponding non-incremental load data instruction is processed. The flags are associated with the disambiguation instructions that are placed aside, and each disambiguation instruction has one flag that indicates it has been passed by another instruction. Once set, a flag remains asserted until the respective load data instruction is pushed back into the data stream, no matter how many other instructions pass it.

If there are two disambiguation instructions placed aside then the next instruction that passes will set the flags for both of the instructions. At the same time, this instruction will account for two instructions being placed aside for disambiguation while the two instructions are passed. Generally the distance between two instructions in a stream is one stride, but since the instruction has passed two instructions ahead of it, the distance between this instruction and the last instruction as seen by the prefetch logic is three-times the stride. When the disambiguation instructions are pushed back into the data stream, the prefetch logic 114 can then ignore them due to the earlier correction.

The stride detection logic 124 is implemented to correct the stride for the non-incremental load data instructions 130 to correlate with a calculated stride of the incremental load data instructions that access the data from contiguous memory addresses. The stride detection logic corrects the stride based on the disambiguation logic accounting for the non-incremental load data instructions, and to represents the data as a sequential data stream having a fixed stride. The prefetch logic can then continue the prefetch requests for the non-incremental load data instructions 130 based on the corrected stride that correlates with the calculated stride of the incremental load data instructions, and the prefetch of data from memory appears sequential for both the incremental load data instructions and the non-incremental load data instructions based on the corrected stride.

Figure 2:
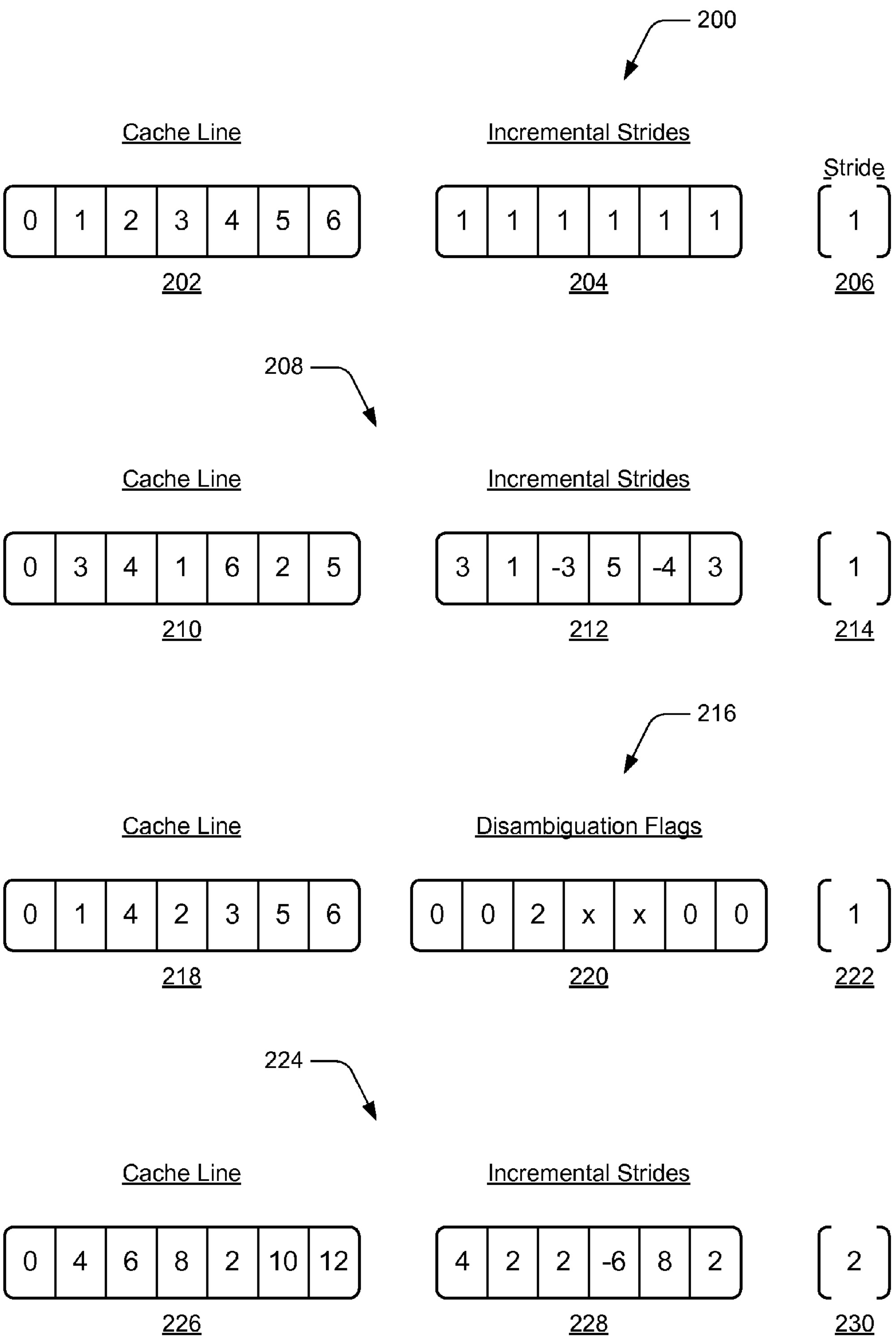
FIG. 2 illustrates examples of determining memory access patterns for cache prefetch in an out-of-order processor.

FIG. 2 illustrates examples of determining memory access patterns for cache prefetch in an out-of-order processor as described herein. An example 200 shows an example cache line 202 with incremental memory access {0,1,2,3,4,5,6} and a representation of the incremental strides 204 as [1,1,1,1,1,1] from one contiguous memory address to the next. The calculated stride 206 (e.g., a stride of 1) is calculated by the stride detection logic 124 that is implemented by the computing device 100, as shown and described with reference to FIG. 1.

Another example 208 of stride correction shows an example cache line 210 with incremental memory access {0,3,4,1,6,2,5} and a representation of the incremental strides 212 as [3,1,−3,5,−4,3] from one memory address to the next. The calculated stride 214 (e.g., a stride of 1) is calculated by the stride detection logic 124, and in this example, the load data instructions (LDR) 1, 2, and 5 are ignored by the stride detection logic. Since LDR 3 has passed LDR 1 and LDR 2, the corrected stride that is carried is 3×(1), the LDR access 4 does not set flags for LDR 1 and LDR 2 as these flags are already asserted for a stride value of 1. The LDR access 6 will see the LDR access 5 being disambiguated since the flag for LDR 5 is not set, but the flag for LDR 2 is set. So the corrected stride value it carries is 2×(1).

The stride detection logic 124 then checks the LDR access 3 against the last access value 0. Since the corrective factor matches the stride distance calculated between the current and previous access, the prefetch logic 114 determines that the data stream of the cache line 210 is contiguous. Similarly, the stride detection logic 124 checks the LDR access 6 against the last access in the prefetch logic, which is the LDR access 4, and since the corrective factor of 2 matches the calculated stride, the data stream still appears as contiguous. This allows for the prefetch logic 114 to continue the prefetch requests even if the load data instructions are out of order.

Another example 216 of stride correction shows an example cache line 218 with incremental memory access {0,1,4,2,3,5,6} and a representation of the disambiguation flags 220 as [0,0,2,x,x,0,0] for each of the load data instructions. The calculated stride 222 (e.g., a stride of 1) as calculated by the stride detection logic 124. In this example, the load data instruction (LDR) 4 is the third instruction having a disambiguation flag of 2 because the LDR 4 is out of order, preceding the LDR access 2 and the LDR access 3, which are both identified with an "x" in the representation of the disambiguation flags 220. The stride detection logic 124 calculates that the difference between the LDR 1 and the LDR 4 is three, minus the disambiguation flag of two, which results in a corrected stride of one. This can be implemented in hardware with a left-shift and an add component.

Another example 224 of stride correction shows an example cache line 226 with incremental memory access {0,4,6,8,2,10,12} and a representation of the incremental strides 228 as [4,2,2,2,−6,2] from one memory address to the next. The calculated stride 230 (e.g., a stride of 2) is calculated by the stride detection logic 124, and in this example, the load data instruction (LDR) 2 is ignored by the stride detection logic for corrected stride distance.

Figure 3:
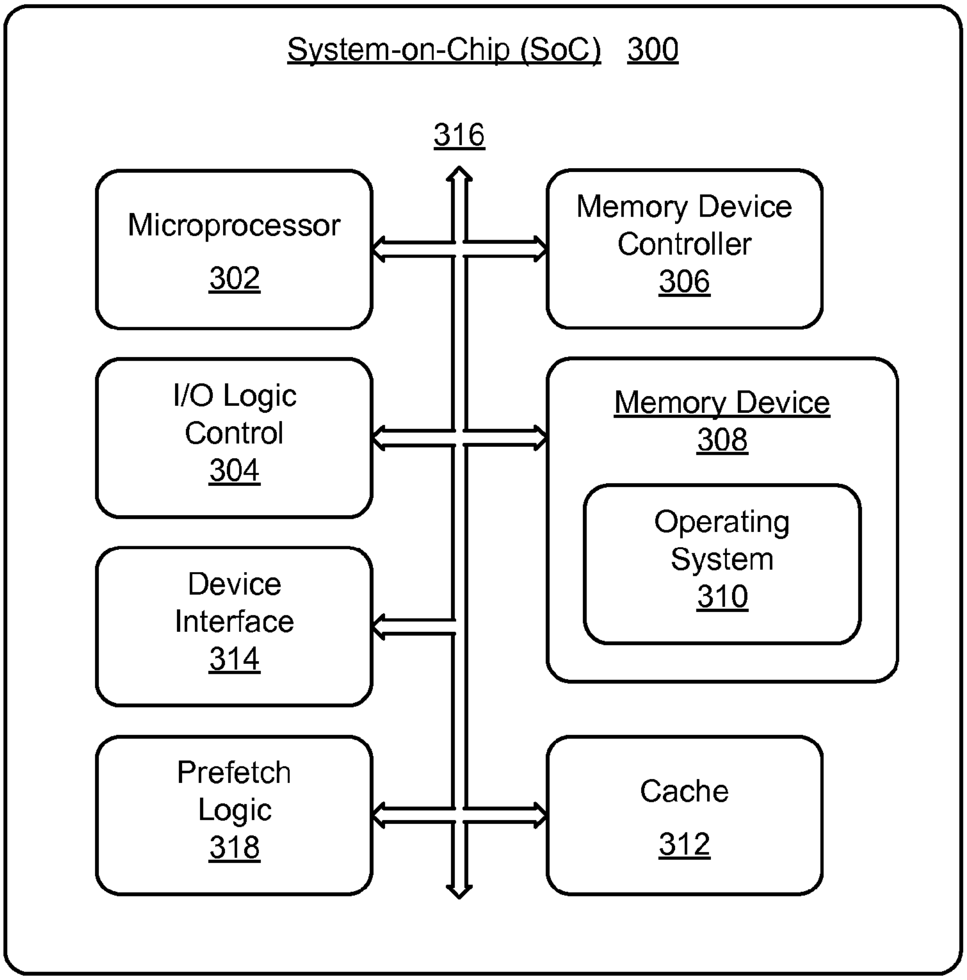
FIG. 3 illustrates an example system-on-chip (SoC) environment in which aspects of determining memory access patterns for cache prefetch in an out-of-order processor can be implemented.

FIG. 3 illustrates an example system-on-chip (SoC) 300, which can implement various aspects of determining memory access patterns for cache prefetch in an out-of-order processor as described herein. The SoC may be implemented in any type of computing device, such as the computing device 100 described with reference to FIG. 1 that may be implemented as any type of computer, mobile phone, tablet device, digital camera, multimedia device, printer, or similar device. The SoC 300 can be integrated with electronic circuitry, a microprocessor, memory, input-output (I/O) logic control, communication interfaces and components, as well as other hardware, firmware, and/or software to implement the computing device 100.

In this example, the SoC 300 is integrated with a microprocessor 302 (e.g., any of a microcontroller or digital signal processor) and input-output (I/O) logic control 304 (e.g., to include electronic circuitry). The SoC 300 includes a memory device controller 306 and a memory device 308, such as any type of a nonvolatile memory and/or other suitable electronic data storage device. The SoC can also include various firmware and/or software, such as an operating system 310 that is maintained by the memory and executed by the microprocessor. The SoC 300 also includes a cache 312 to maintain data copied from system memory.

The SoC 300 includes a device interface 314 to interface with a device or other peripheral component, such as when installed in the computing device 100 as described herein. The SoC 300 also includes an integrated data bus 316 that couples the various components of the SoC for data communication between the components. The data bus in the SoC may also be implemented as any one or a combination of different bus structures and/or bus architectures.

In aspects of determining memory access patterns for cache prefetch in an out-of-order processor, the SoC 300 includes prefetch logic 318 that can be implemented as computer-executable instructions maintained by the memory device 308 and executed by the microprocessor 302. Alternatively, the prefetch logic 318 can be implemented as hardware, in firmware, fixed logic circuitry, or any combination thereof that is implemented in connection with the I/O logic control 304 and/or other processing and control circuits of the SoC 300. Examples of the prefetch logic 318, as well as corresponding functionality and features, are described with reference to the prefetch logic 114 shown in FIG. 1.

Example method 400 is described with reference to FIG. 4 in accordance with one or more aspects of determining memory access patterns for cache prefetch in an out-of-order processor. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 4:
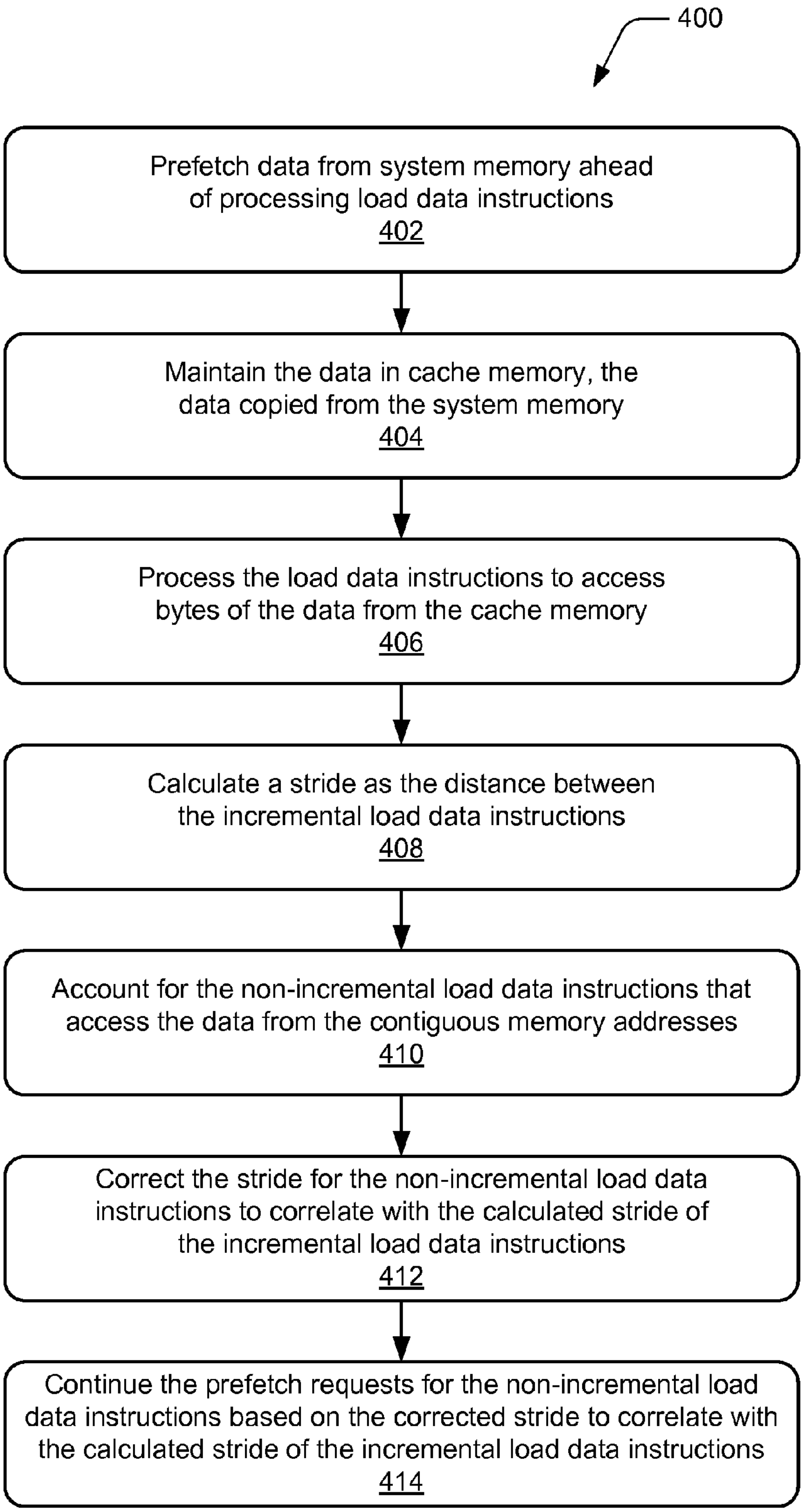
FIG. 4 illustrates example methods of determining memory access patterns for cache prefetch in an out-of-order processor in accordance with one or more aspects.

FIG. 4 illustrates example method(s) 400 of determining memory access patterns for cache prefetch in an out-of-order processor, and is described with reference to the computing device 100 shown in FIG. 1. The order in which the method is described is not intended to be construed as a limitation, and any number of the described method operations can be combined in any order to implement the method, or an alternate method.

At 402, data is prefetched from system memory ahead of processing load data instructions. For example, the processor 102 of the computing device 100 implements the prefetch logic 114 that initiates prefetch requests for the data 106 from the system memory 104 based on the load data instructions 118 that access the data from contiguous memory addresses.

At 404, the data is maintained in cache memory, where the data is copied from the system memory. For example, the computing device 100 implements an L1 cache 110 and an L2 cache 112, either or both of which maintain the respective cached data 120 and 122 that is prefetched from the system memory.

At 406, the load data instructions are processed to access bytes of the data from the cache memory. For example, the processor 102 of the computing device 100 processes the load data instructions 118 and a load-store unit 116 of the processor accesses bytes of the cached data 120, 122 from either of the L1 cache 110 or the L2 cache 112. The load data instructions 118 include the incremental load data instructions 128 and the non-incremental load data instructions 130 that access the data from contiguous memory addresses.

At 408, a stride is calculated as the distance between the incremental load data instructions. For example, the processor 102 implements the prefetch logic 114, which includes the stride detection logic 124 that calculates the stride 214 of the incremental load data instructions 128 that access the data from contiguous memory addresses.

At 410, the non-incremental load data instructions are accounted for that access the data from the contiguous memory addresses. For example, the processor 102 implements the disambiguation logic 126 to account for the non-incremental load data instructions 130 that access the data from the contiguous memory addresses. In implementations, the non-incremental load data instructions are accounted for by asserting a flag for each of the non-incremental load data instructions 130 that are set aside to process one or more of the incremental load data instructions 128. Consecutive ones of the non-incremental load data instructions can be flagged and set aside, and a flag for a non-incremental load data instruction remains asserted until the non-incremental load data instruction is processed.

At 412, the stride is corrected for the non-incremental load data instructions to correlate with the calculated stride of the incremental load data instructions. For example, stride detection logic 124 corrects the stride 214 for the non-incremental load data instructions 130 to correlate with the calculated stride of the incremental load data instructions 128. The corrected stride 214 represents the data as a sequential data stream having a fixed stride, and the stride detection logic 124 corrects the stride based on the accounting for the non-incremental load data instructions.

At 414, the prefetch requests are continued for the non-incremental load data instructions based on the corrected stride to correlate with the calculated stride of the incremental load data instructions. For example, prefetch logic 114 continues to initiate the prefetch requests for the data 106 from the system memory 104 based on the non-incremental load data instructions 130 that access the data from contiguous memory addresses, where prefetching the data from the system memory appears sequential for both the incremental load data instructions and the non-incremental load data instructions based on the corrected stride.

Figure 5:
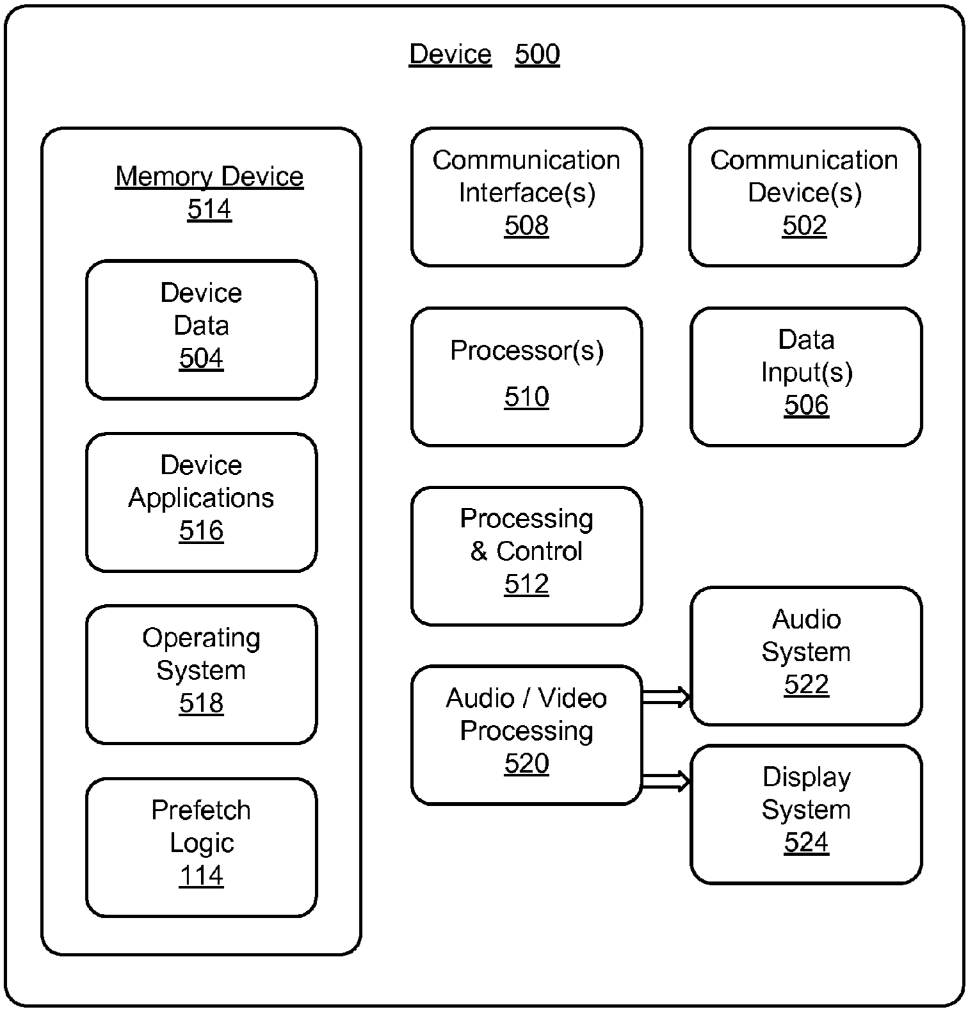
FIG. 5 illustrates various components of an example device that can implement aspects of determining memory access patterns for cache prefetch in an out-of-order processor.

FIG. 5 illustrates various components of an example device 500 that can be implemented as any of the devices or systems described with reference to the previous FIGS. 1-4, such as any type of a computing device 100 as described with reference to FIG. 1. The device 500 may also be implemented to include the example system-on-chip (SoC) described with reference to FIG. 3. The device 500 may be associated with a user (i.e., a person) and/or an entity that operates the device such that a device describes logical devices that include users, software, firmware, hardware, and/or a combination of devices.

The device 500 includes communication devices 502 that enable wired and/or wireless communication of device data 504, such as received data, data that is communicated between devices, data packets of the data, etc. The device 500 also includes one or more data inputs 506 via which any type of data, media content, and/or inputs can be received, such as user-selectable inputs and any other type of audio, video, and/or image data received from any content and/or data source. The data inputs 506 may include USB ports, coaxial cable, and other serial or parallel connectors (including internal connectors) for flash memory, DVDs, CDs, and the like. The data inputs can be used to couple the device to internal and/or external components, peripherals, and accessories, such as keyboards, microphones, cameras, and any other types of devices.

The device 500 also includes communication interfaces 508, such as any one or more of a serial, parallel, network, or wireless interface. The communication interfaces provide a connection and/or communication links between the device and a network by which other electronic, computing, and communication devices communicate data with the device. Although not shown, the device can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The device 500 includes one or more processors 510 (e.g., any of microprocessors, controllers, and the like), or a processor and memory system (e.g., implemented in an SoC), which processes computer-executable instructions to control the operation of the device. Alternatively or in addition, the device can be implemented with any one or combination of software, hardware, firmware, or fixed logic circuitry that is implemented in connection with processing and control circuits which are generally identified at 512.

The device 500 also includes one or more memory devices 514 (e.g., computer-readable storage media) that enable data storage, such as random access memory (RAM), non-volatile memory (e.g., read-only memory (ROM), flash memory, etc.), and a disk storage device. A disk storage device may be implemented as any type of magnetic or optical storage device, such as a hard disk drive, a recordable and/or rewriteable disc, and the like. The device may also include a mass storage media device. Computer-readable storage media can be any suitable electronic data storage that is accessed by a computing device.

A memory device 514 provides data storage mechanisms to store the device data 504, other types of information and/or data, and device applications 516. For example, an operating system 518 can be maintained as a software application with the memory device and executed on the processors. The device applications may also include a device manager or controller, such as any form of a control application, software application, signal processing and control module, code that is native to a particular device, a hardware abstraction layer for a particular device, and so on. In this example, the device applications 516 also include the prefetch logic 114 (to include the stride detection logic 124 and the disambiguation logic 126) to implement aspects of determining memory access patterns for cache prefetch in an out-of-order processor when the device 500 is implemented as the computing device 100. Although shown implemented as a software application or module in the example device 500, the prefetch logic 114 may be implemented in the general context of software, firmware, hardware (e.g., fixed logic circuitry), or any combination thereof.

The device 500 may also include an audio and/or video processing system 520 that generates audio data for an audio system 522 and/or generates display data for a display system 524. The audio system and/or the display system may include any devices that process, display, and/or otherwise render audio, video, display, and/or image data. In implementations, the audio system and/or the display system are external components to the device. Alternatively, the audio system and/or the display system are integrated components of the example device.

Although aspects of determining memory access patterns for cache prefetch in an out-of-order processor have been described in language specific to features and/or methods, the appended claims are not necessarily limited to the specific features or methods described. Rather the specific features and methods are disclosed as example implementations of determining memory access patterns for cache prefetch in an out-of-order processor, and other equivalent features and methods are intended to be within the scope of the appended claims. Further, various different aspects are described and it is to be appreciated that each described aspect can be implemented independently or in connection with one or more other described aspects.

What is claimed is:

1. A computing device, comprising:

cache memory configured to maintain data that is copied from system memory;

a processor configured to process load data instructions to access bytes of the data from the cache memory, the load data instructions including both incremental load data instructions and non-incremental load data instructions that access the bytes of data from contiguous memory addresses;

prefetch logic configured to prefetch the data from the system memory ahead of processing the load data instructions, the prefetch logic configured to initiate prefetch requests based on the load data instructions; and stride detection logic configured to calculate a stride as the distance between the incremental load data instructions, the stride detection logic further configured to correct the stride for the non-incremental load data instructions to correlate with the calculated stride of the incremental load data instructions.

2. The computing device as recited in claim 1, wherein the prefetch logic is configured to continue the prefetch requests for the non-incremental load data instructions based on the stride as corrected to correlate with the calculated stride of the incremental load data instructions.

3. The computing device as recited in claim 1, wherein the stride detection logic is configured to correct the stride to represent the bytes of data as a sequential data stream having a fixed stride.

4. The computing device as recited in claim 1, wherein the prefetch of the data from the system memory appears sequential for both the incremental load data instructions and the non-incremental load data instructions based on the stride as corrected.

5. The computing device as recited in claim 1, further comprising disambiguation logic configured to account for the non-incremental load data instructions that access the bytes of data from the contiguous memory addresses; and wherein the stride detection logic is configured to correct the stride based on the disambiguation logic accounting for the non-incremental load data instructions.

6. The computing device as recited in claim 5, wherein the disambiguation logic is configured to assert a flag for a non-incremental load data instruction that has been set aside to process an incremental load data instruction, the flag remaining asserted until the non-incremental load data instruction is processed.

7. The computing device as recited in claim 5, wherein the disambiguation logic is configured to assert a flag for each of the non-incremental load data instructions that are set aside to process one or more of the incremental load data instructions, wherein consecutive ones of the non-incremental load data instructions are flagged and set aside.

8. The computing device as recited in claim 1, wherein the cache memory, the processor, the prefetch logic, and the stride detection logic are embodied on a system-on-chip (SoC) to implement a stride distance correction to said correct the stride.

9. A method, comprising:

maintaining data in cache memory, the data copied from system memory;

processing load data instructions to access bytes of the data from the cache memory, the load data instructions including both incremental load data instructions and non-incremental load data instructions that access the bytes of data from contiguous memory addresses;

prefetching the data from the system memory ahead of processing the load data instructions, prefetch requests being initiated based on the load data instructions;

calculating a stride as the distance between the incremental load data instructions; and correcting the stride for the non-incremental load data instructions to correlate with the calculated stride of the incremental load data instructions.

10. The method as recited in claim 9, further comprising:

continuing the prefetch requests for the non-incremental load data instructions based on the corrected stride to correlate with the calculated stride of the incremental load data instructions.

11. The method as recited in claim 9, wherein said correcting the stride comprises representing the bytes of data as a sequential data stream having a fixed stride.

12. The method as recited in claim 9, wherein said prefetching the data from the system memory appears sequential for both the incremental load data instructions and the non-incremental load data instructions based on the corrected stride.

13. The method as recited in claim 9, further comprising:

accounting for the non-incremental load data instructions that access the bytes of data from the contiguous memory addresses; and said correcting the stride based on the accounting for the non-incremental load data instructions.

14. The method as recited in claim 13, wherein said accounting for the non-incremental load data instructions comprises asserting a flag for a non-incremental load data instruction that has been set aside to process an incremental load data instruction, the flag remaining asserted until the non-incremental load data instruction is processed.

15. The method as recited in claim 13, wherein said accounting for the non-incremental load data instructions comprises asserting a flag for each of the non-incremental load data instructions that are set aside to process one or more of the incremental load data instructions, wherein consecutive ones of the non-incremental load data instructions are flagged and set aside.

16. A method, comprising:

processing load data instructions to access data from cache memory, the load data instructions including both incremental load data instructions and non-incremental load data instructions that access the data from contiguous memory addresses;

prefetching the data from system memory ahead of processing the load data instructions, prefetch requests being initiated based on the load data instructions;

calculating a stride as the distance between the incremental load data instructions; and accounting for the non-incremental load data instructions that access the data from the contiguous memory addresses, the accounting enabling the prefetch requests for the non-incremental load data instructions based on the calculated stride.

17. The method as recited in claim 16, further comprising: correcting the stride for the non-incremental load data instructions to correlate with the calculated stride of the incremental load data instructions, the corrected stride representing the data as a sequential data stream having a fixed stride.

18. The method as recited in claim 17, further comprising: continuing the prefetch requests for the non-incremental load data instructions based on the corrected stride to correlate with the calculated stride of the incremental load data instructions.

19. The method as recited in claim 17, wherein said prefetching the data from the system memory for both the incremental load data instructions and the non-incremental load data instructions appears sequential based on the corrected stride.

20. The method as recited in claim 16, wherein said accounting for the non-incremental load data instructions comprises asserting a flag for each of the non-incremental load data instructions that are set aside to process an incremental load data instruction, the flag for a non-incremental load data instruction remaining asserted until the non-incremental load data instruction is processed.

* * * * *